July 10, 1951   W. J. WALDRON   2,560,015
CONTROL OPERATING DEVICE
Filed Nov. 2, 1948
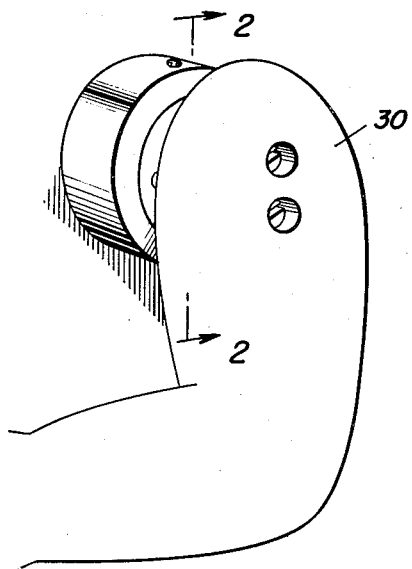
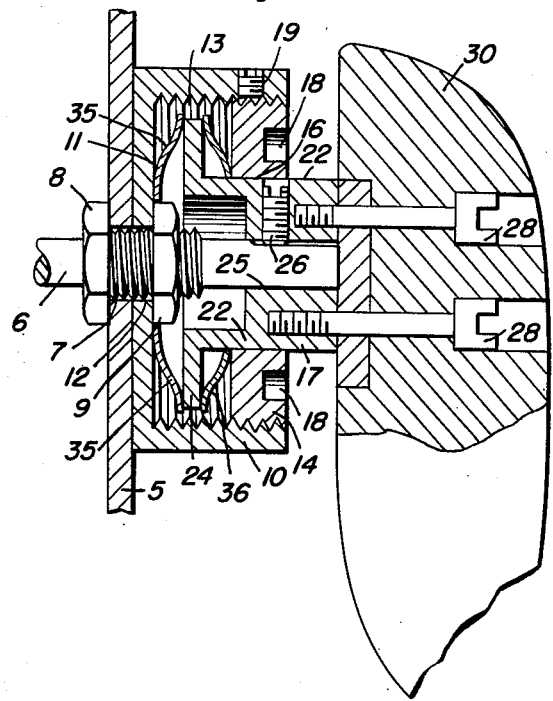
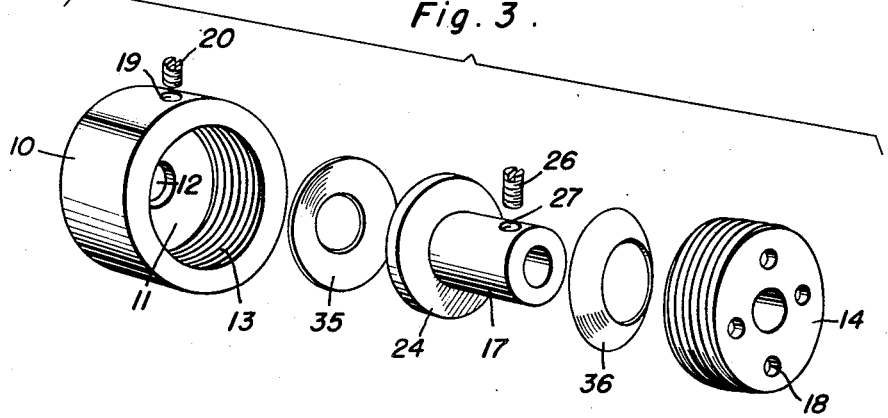
Walter J. Waldron
INVENTOR.
BY *Clarence A. O'Brien*
*and Harvey B. Jackson*
Attorneys Patented July 10, 1951

2,560,015

UNITED STATES PATENT OFFICE 2,560,015

CONTROL OPERATING DEVICE

Walter J. Waldron, Pomona, Calif.

Application November 2, 1948, Serial No. 57,996

1 Claim. (Cl. 74—531)

This invention relates to devices for operating the controls of instruments, apparatus or components thereof and it has for its principal object to provide means for preventing a predetermined constant or varying, permanent or intermittent load, acting on the control operating means, such as a handle, from influencing the adjustment of the instrument, apparatus or components thereof.

In radio and other apparatus, provided with adjustable units or components it may be necessary or advisable to operate the control shaft, such for instance as the shaft of the tuning condenser, the volume control and the like by an operating means such as a handle or lever which is not balanced and which has therefore the tendency to move under the influence of its own weight or under the influence of some weight attached to it or of some tension applied to it to a definite position. Therefore the adjustment of the apparatus, instrument or unit connected with said handle cannot be maintained in a determined position; in such a case the operative control handle cannot be permanently coupled with the control shaft but has to be provided with a coupling permitting to engage or to disengage the control handle before every operation or adjustment.

In order to avoid such an engagement and disengagement operation, coupling the control operating means with the control shaft, a balancing arrangement is provided according to the present invention which permits to maintain a direct coupling between the control shaft and the loaded control lever or handle. This result is obtained by subjecting the said control lever or handle to a frictional load by means of an intermediate friction member which load counter-balances the original or predetermined constant or varying load of the control lever or handle. The said frictional load is obtained by means of a closed box member encasing a flange member projecting outwardly from a member coupled or connected with the control lever or handle, said flange being subjected to frictional elastic pressure on both sides by curved or stepped disk springs applied against the same and against the wall of the box member. By making one wall or both walls of the box member adjustable said tension of the disk springs and the frictional pressure exerted by said springs may be adjusted so that it is possible to counter-balance different loads up to a certain predetermined limit.

On account of the frictional counter-balancing the load may vary, but is never allowed to influence or to move the control shaft, if it does not exceed a certain predetermined amount. The load, as will be clear, may be variable or intermittent within the aforesaid limits.

It is therefore an object of the invention to provide counter-balancing means for a loaded control lever or handle, acting on the control shaft of an instrument or apparatus or of a unit or component thereof which prevents said load from becoming active on the shaft and from changing any adjustment of the control shaft for which the latter may have been set.

It is a further object of the invention to provide means of the character above described which exclude the influence of permanent or intermittent and of variable or constant loads, acting on the control lever or handle, from the control shaft, provided these loads remain below a predetermined limit.

It is a further object of the invention to provide an elastic frictional counter-balancing means for a load acting on the control lever or handle of a control shaft, said means being adjustable for a predetermined load.

It is a further object of the invention to provide counter-balancing means for the permanent or varying load of a control lever or handle which means include a fixed connection of said control lever or handle with said control shaft, said connection including a member provided with an outwardly projecting flange, enclosed within a fixedly mounted box member, said flange being kept under frictional elastic pressure by means of stepped or curved disk springs applied against said flange and against the walls of said box member.

Further objects of the invention will be apparent from the following detailed specification.

The invention is illustrated in the accompanying drawing showing one embodiment thereof by way of example. This example is intended to explain the principle of the invention and the best mode of applying this principle, and this explanation will supply the expert skilled in the art with the information required to apply the principle of the invention under different conditions. Further application and modifications not specifically described are therefore not necessarily departures from the invention.

2,560,015

3

In the drawings:

Figure 1 is a perspective view of an embodiment of the invention when applied to a radio doll.

Figure 2 is an elevational sectional view through the same embodiment, the section being taken along the plane of symmetry indicated by line 2—2 in Figure 1.

Figure 3 is an exploded perspective view of all the parts and members of the device connecting a control lever or handle with a control shaft.

The counter-balancing and coupling device according to the invention is inserted between the control lever or handle of an instrument, apparatus or component thereof and the operating shaft of said instrument or apparatus. It is assumed that the control lever or handle is under the influence of a load or tension and the purpose of the device consists in counter-acting said load which may act permanently or intermittently and may be constant or variable. The load is thus prevented from influencing the adjustment of the instrument or apparatus or of the component or unit thereof which is connected with the said lever or handle.

The counter-action or counter-balancing is obtained by a resilient friction producing means. The force which is necessary for operating the instrument has to overcome the frictional load and, as the control shaft of the instrument or apparatus is free from any load acting on the control lever or handle as long as the load on said lever or handle is smaller than the frictional load, the adjustment of said instrument or apparatus connected with the control is not influenced by the load acting on the control lever or handle and is solely under the influence of a force which exceeds the said load.

As will be seen from the drawing 5 designates the wall of a casing, container or housing for the apparatus or instrument which has to be operated by means of a control lever or handle which is loaded. The example which has been illustrated is that of a so-called radio doll in which the radio apparatus is mounted within the body of the doll, the articulated arms of the doll forming the handles by means of which the units of the radio apparatus are operated. However it is to be understood that this invention may be applied to any instrument, device or apparatus containing units or components which have to be adjusted by means of a loaded lever or handle or by any other loaded device.

In the example shown 6 is the shaft by means of which the instrument or apparatus is adjusted. This shaft may, for instance, be the control shaft of a tuning condenser. The shaft is journalled within a bearing sleeve 7 which is threaded on the outside and which is held in the wall 5 by means of the nuts 8, 9.

These nuts also hold the box member 10 which is closed at one end, its bottom 11 being however provided with an opening 12 for the passage of the sleeve 7.

The box member 10 is internally threaded at 13 and is closed by means of a threaded plug member 14 which may be screwed into the said box member. A completely closed box of adjustable depth is thus formed by the insertion of the plug member.

The plug member 14 also forms a bearing sleeve and therefore has a central bore 16 which is adapted to act as a journal for the sleeve like friction member 17. In order to be able to adjust the position of the plug member 14 within

4 the box member 10 holes 18 are provided on the outside of the plug member for the insertion of a suitable tool.

The box member 10 may be provided with a threaded bore 19 into which a set screw 20 is inserted which is applied against the periphery of the plug member 14 in order to fix the relative positions of the box member and the plug member.

The friction member 17 comprises a sleeve 22 provided with a projecting flange 24 at its end. The sleeve 22 is journalled within the bore 16 of the plug member and is provided with a bore 25 into which the shaft 6 fits. The shaft 6 is frictionally connected with the friction member by appropriate means such as a key or a set screw 26, passing through a threaded bore 27 of the sleeve.

It will thus be seen that the flange 24 of the frictional member is located in the interior of the box member and is surrounded by the same, the bottom and the inner face of the plug being arranged in substantial parallelism to the faces of the flange.

The handle 30 which is shown in the drawing as being the arm of the radio doll is secured to said friction member 17 by means of screws 28 or in any other fashion which is compatible with the material out of which the arm of the doll is formed.

Between the flange 24 the friction member 17 and the bottom and plug member of the box annular curved or stepped spring disks 35, 36 are arranged. The curved or stepped profile is so selected that the space between the face of the flange and the faces of the bottom and plug member respectively is bridged.

These springs are put under tension and are somewhat flattened by the plug member when screwed into the box member. They therefore exercise an adjustable elastic frictional pressure on the flange. This elastic frictional pressure must be so adjusted that it is sufficient to counterbalance the load which may be put on the handle 30.

It will therefore be seen that any load on the handle 30, whether constant or variable, cannot act on the shaft 6, unless it exceeds the frictional pressure exercised by the compressed disk springs. The load which is held by the springs is finely adjustable by means of the plug member 14.

The adjustment of the instrument is therefore not changed or impaired by the fact that a load is acting on the handle and the latter is held in any position into which it may be set. It will also be noted that the load varies with the momentum which in its turn varies with the position of the arm of the doll or any other handle. This variation of the load is however without influence as long as the load does not exceed the predetermined counter-balancing frictional pressure which has been put on the disk springs.

It will be understood that changes of an unessential nature or of details of the construction will not affect the principle of the invention as above described.

Having described the invention, what is claimed as new is:

In combination with a control shaft having a load-carrying handle producing an unbalanced system, a frictional load counterbalancing means comprising a fixed housing about said shaft, a sleeve keyed to said shaft and secured to said handle, said sleeve extending into said housing and having an outwardly projecting flange at its inner end spaced from the inner walls of said housing, curved disk springs supported in said housing and bearing against both sides of said flange, and means for adjusting the tension on said springs to counterbalance the load on the handle, said means including a plug threadedly received in one wall of said housing and bearing against one of said disk springs.

WALTER J. WALDRON.

REFERENCES CITED

The following references are of record in the file of this patent:

UNITED STATES PATENTS

| Number | Name | Date |
|---|---|---|
| 1,574,715 | Wamer | Feb. 23, 1926 |
| 1,588,039 | Monosmith | June 8, 1926 |
| 1,624,114 | Norviel | Apr. 12, 1927 |
| 1,702,826 | Gruenewald | Feb. 19, 1929 |
| 1,727,778 | Kull | Sept. 10, 1929 |
| 1,828,425 | Matthews | Oct. 20, 1931 |
| 2,375,098 | Geczy | May 1, 1945 |
| 2,452,916 | Fleischman | Nov. 2, 1948 |